United States Patent [19]

Schatz

[11] Patent Number: 5,637,798

[45] Date of Patent: Jun. 10, 1997

[54] CIRCUIT ARRANGEMENT FOR EVALUATING AN ACCELERATION SENSOR SIGNAL

[75] Inventor: Oliver Schatz, Reutlingen, Germany

[73] Assignee: Robert Bosch GmbH, Stuttgart, Germany

[21] Appl. No.: 552,577

[22] Filed: Nov. 3, 1995

[30] Foreign Application Priority Data

Nov. 3, 1994 [DE] Germany .................. 44 39 203.6

[51] Int. Cl.[6] ............................................. G01P 15/125
[52] U.S. Cl. .............................................. 73/514.32
[58] Field of Search ............................. 324/661, 683; 73/514.01, 514.16, 514.18, 514.32

[56] References Cited

U.S. PATENT DOCUMENTS 5,345,824 9/1994 Sherman ..................... 73/514.32
5,417,312 5/1995 Tsuchitani ................... 73/514.32

FOREIGN PATENT DOCUMENTS

4316263A1 11/1993 Germany .

*Primary Examiner*—Hezron E. Williams
*Assistant Examiner*—Christine K. Oda
*Attorney, Agent, or Firm*—Michael J. Striker

[57] ABSTRACT

The invention is a circuit arrangement for evaluating a capacitive signal from an acceleration sensor, in which an acceleration-dependent capacitance change is evaluated by measuring the voltage at the oscillator. After each voltage change, the charge of the two capacitor elements of a differential capacitor is neutralized by applying a predetermined voltage, preferably the operating voltage. When a new acceleration occurs, a voltage difference relative to the predetermined voltage is again determined. The voltage difference is converted into a pulse-width modulated signal and is used for supplying the two capacitor elements of the acceleration sensor. The circuit arrangement is preferably usable for activating an air bag in a motor vehicle.

14 Claims, 3 Drawing Sheets

CIRCUIT ARRANGEMENT FOR EVALUATING AN ACCELERATION SENSOR SIGNAL

BACKGROUND OF THE INVENTION

The invention is based on a circuit arrangement for evaluating a capacitive signal from an acceleration sensor, according to the generic type of the main claim. EP 0,459,723 A2 has already disclosed a circuit arrangement in which, in the case of a capacitive acceleration sensor, the differential charging of the two capacitors, which occurs between the oscillator and two fixed electrodes of the two capacitors, is measured. If an acceleration which causes a deflection of the oscillating mass takes place, then the capacitance of the two capacitors changes. Measurement of the differential charging requires a relatively long time, so that the drive frequency for the acceleration sensor must be relatively low. Since the drive frequency is simultaneously used for positional control, the inertia of the sensor must be large enough to prevent it from being excited into natural oscillations. However, this large mass makes positional control for relatively high acceleration ranges such as, for example, are necessary in air bag applications, impossible with the supply voltages ≦5 V which are usual in control devices.

SUMMARY OF THE INVENTION

The circuit arrangement according to the invention having the distinguishing features of the main claim has the advantage over this that the charge can be transferred between the capacitor elements at a measurement frequency which is an order of magnitude higher than in the case of known circuit technology. The total charge remains constant during one clock cycle. As a result, the occurrence of differential capacitances caused by acceleration gives rise to voltage deviations which can be measured quickly.

As a result of the high measurement frequency it is even possible to utilize sensors with very small mass, for example micromechanical sensors on semiconductor chips. A particular advantage is that the high measurement frequency, in conjunction with micromechanical sensors, also allows positional control with a small supply voltage in the case of high acceleration.

A further advantage is that the filtering required to obtain the output signal can be considerably reduced, since the filtering capacitors can likewise be integrated on the semiconductor chip.

A further particular advantage is that only one operating voltage is required for operating the circuit arrangement, and further stabilized voltages for positional control and/or evaluation are not required. In this case it is also advantageous that the positional control range is proportional to the operating voltage.

Advantageous refinements and improvements of the circuit arrangement proposed in claim 1 are possible by virtue of the measures referred to in the dependent claims. A particular advantage is that the center voltage of the two capacitors can be connected to the operating voltage using a simple switch. Since the center voltage changes when an acceleration occurs, it is advantageous to measure and evaluate only the deviation from the operating voltage. Particularly good stability of the operating voltage is then not an important factor.

It is also beneficial to amplify the center voltage using an amplifier in such a way that it can be processed as a suitable quantity for further processing, for example for storage in a sample & hold storage device. This amplifier advantageously has a MOS input and can therefore amplify even voltages which are above the supply voltage. Two sample & hold storage devices are advantageously connected to the output. In this case each storage device stores the amplified voltage deviation from the operating voltage of one capacitor element. These two voltages can then advantageously be fed to a differential amplifier which determines the acceleration-dependent voltage difference from the stored voltage values.

Because of the differential evaluation, particular stability of the working points of the amplifier is not an important factor.

A switching logic unit which can be produced, for example, in MOS technology with tried and tested methods, is advantageously employed for switching over between the two storage devices or resetting the center voltage.

It is furthermore advantageous to convert the acceleration-dependent voltage difference into a pulse-width modulated signal (PWM signal) by means of a sawtooth generator. The PWM signal can then be fed to the drivers, which produce a corresponding signal for positional control of the oscillator.

By means of corresponding filtering and/or a tunable output amplifier, the acceleration signal, which is proportional to the operating voltage, is advantageously also provided at the output of the evaluation circuit.

A particular advantage is that a controller block is provided, for example, at the output of the differential amplifier, in the case of which block a test signal for testing the functional integrity of the circuit arrangement is fed in via an input. Using this input, it is possible to carry out an automatic self-test, for example using an external program, in order to monitor the functional reliability of this arrangement.

By virtue of combination with a micromechanical acceleration sensor, it is preferably possible to integrate the circuit arrangement using MOS technology, so that the acceleration sensor forms a compact component with the evaluation circuit. Such a component can preferably be used for activating an air bag.

BRIEF DESCRIPTION OF THE DRAWING

An exemplary embodiment of the invention is represented in the drawing and explained in more detail in the description below. FIGS. 2a to 2e show diagrams.

DESCRIPTION OF THE PREFERRED EMBODIMENT

Figure 1:
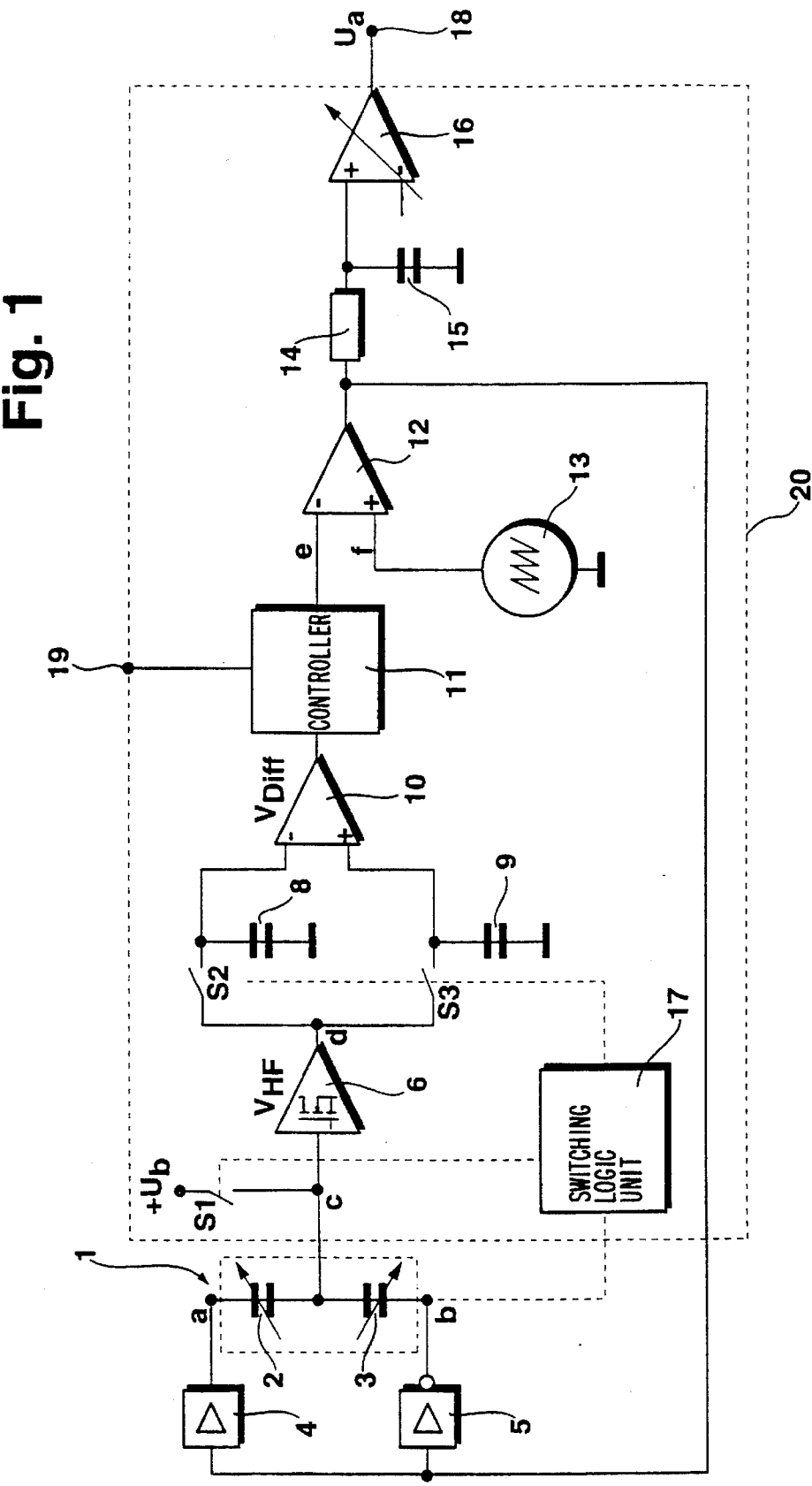
FIG. 1 shows a block circuit diagram of the circuit arrangement.

FIG. 1 shows a block circuit diagram of an evaluation circuit 20 which is connected to a sensor 1. The sensor 1 is, for example, produced in the form of a micromechanical sensor from a semiconductor chip. It has a very small inertial mass which is suspended on a spring in such a way that the inertial mass is deflected under the action of an acceleration force. An electrode is arranged on the inertial mass, which electrode forms, in conjunction with two fixed electrodes between which the inertial mass can oscillate, two capacitor elements which each produce different capacitances according to the deflection. The fixed electrodes are connected to outputs of drivers 4, 5. The center electrode on the inertial mass is led out as the center tap c. The center tap c is connected via a first switch S1 preferably to the operating voltage $U_b$. The center tap c is furthermore connected to the input of an amplifier 6. The output of the amplifier 6 is fed to two parallel switches S2, S3 whose second terminal is connected to a first storage device 8 and to a second storage device 9, respectively. The two storage devices 8, 9 are preferably designed as sample & hold storage devices. A switching logic unit 17 controls the switches S1, S2, S3 in time with the transfer of charge between the two capacitors 2, 3. The outputs of the two storage devices 8, 9 are fed to the inputs of a differential amplifier 10, at the output of which an acceleration-dependent voltage difference can be picked off. According to FIG. 1, a controller 11 which has a separate input 19 via which a test signal can be fed in is connected downstream thereof. The output of the controller 11 is fed to a modulator which is formed by a comparator 12 and a sawtooth generator 13. The output of the modulator is fed back to control inputs of the drivers 4, 5. The output of the comparator 12 is furthermore connected to a low-pass filter which is formed by a series resistor 14 and a capacitor 15 forming a line to earth. The output of the low-pass filter is connected to an output amplifier 16 whose gain can preferably be tuned to a predetermined value. The output 18 of the output amplifier 16 is at the acceleration-dependent voltage $U_a$. This voltage can, for example, be used for activating an air bag in a motor vehicle.

The individual modules as well as the micromechanical sensor are known per se and need not therefore be explained in further detail.

Figure 2A:
Figure 2B:
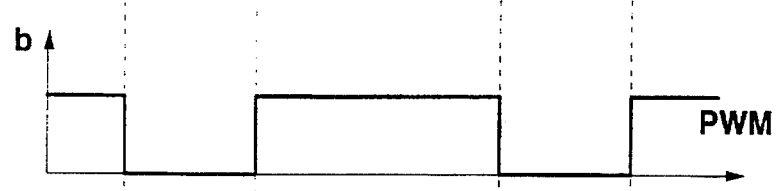

The mode of operation of this circuit arrangement will be explained in more detail with the aid of FIGS. 2a to 2e. For the sensor 1 it is assumed that the two capacitors 2, 3 have an acceleration-dependent capacitance difference. Both capacitors 2, 3 have their charge transferred periodically and in phase opposition, in time with the drive system, using square-wave signals from the drivers 4, 5. The amplitude of the square-wave signals preferably corresponds to the operating voltage $U_b$. The two drivers 4, 5 output a pulse-width modulated signal (PWM signal) to the two fixed electrodes of the capacitors 2, 3 at the inputs a, b. FIGS. 2a and 2b show the voltage wave form at the input terminals a, b. While, according to FIG. 2a, the pulse $U_b$ is applied during a time period to the input terminal a, no pulse is applied according to FIG. 2b to the input terminal b. During the off period at the input a, the PWM signal is, in contrast, applied to the input b. Under the action of an acceleration, a capacitance difference is produced which causes, according to FIG. 2c, a small voltage jump at the center tap c during charge transfer, the magnitude of which jump depends on the acceleration which has taken place. This voltage jump occurs at each switching edge of the two inputs a, b. The acceleration-dependent voltage change $\Delta U_1$ is calculated from the formula $$\Delta U_1 = U_b * \frac{\Delta C}{2C_0},$$

$\Delta U_1$ being the acceleration-dependent voltage change, $U_b$ being the operating voltage, $\Delta C$ being the change in capacitance under the action of an acceleration on the sensor 1, and $C_0$ being the capacitance of a capacitor 2, 3.

Figure 2C:
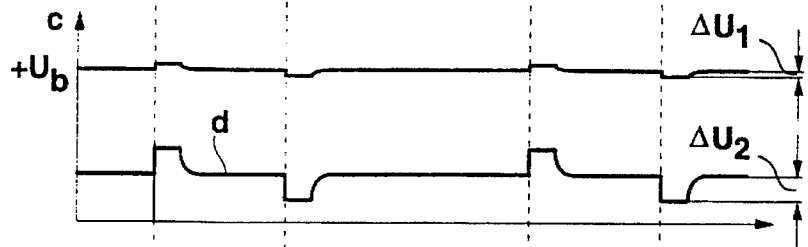
Figure 2C:
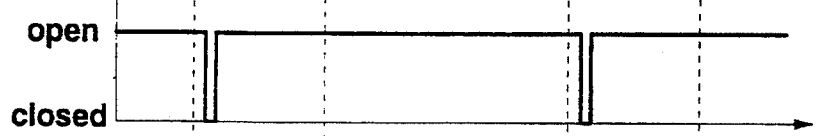
Figure 2C:
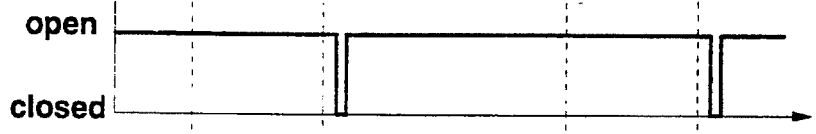
Figure 2C:
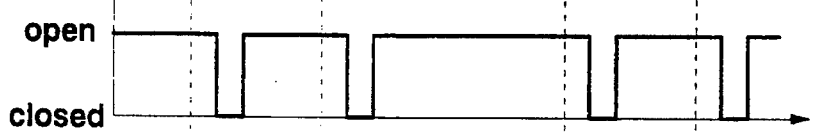

After measurement of the voltage at the center tap C, according to FIG. 2c, the switch S1 is closed, so that the operating voltage $U_b$ is then again applied to the center tap C. The starting conditions for the next measurement cycle are thereby provided.

The amplifier 6 has a high input impedance and is preferably equipped with a MOS input. According to FIG. 2c, it amplifies the voltage change $\Delta U_1$ and delivers the signal $\Delta U_2$. The DC potential is also reduced. The switching logic unit 17 then controls the switches S2 and S3 alternately in such a way that the voltage change, which is, for example, positive relative to the operating voltage (first section of the curve d in FIG. 2c), is stored in the first storage device 8, and the negative voltage change corresponding to the second section of the curve d in FIG. 2c is stored in the second storage device 9. The maximum voltage change between the two capacitors 2, 3 is defined as $\Delta U_2$. The sample & hold storage devices 8, 9 are known per se and need not therefore be explained in more detail. The output of the differential amplifier 10 connected downstream is thus at the voltage $\Delta U_2$, which is proportional to the change in the capacitance of the sensor I and therefore to the acceleration which has taken place. By sampling both the upper and lower voltage deviations, a drift in the working point of the amplifier 6 is eliminated. The differential signal is given by $$\Delta U_2 = V_{HF} * V_{Dif} * U_b \frac{\Delta C}{C_0},$$

$V_{HF}$ being the gain factor of the amplifier 6, and $V_{Dif}$ being the differential gain at the output of the differential amplifier 10.

FIGS. 2c.1, 2c.2 and 2c.3 show the instants at which the switches S2, S3 and S1 are closed by the switching logic unit 17. After each time the charge of the capacitor elements 2, 3 has been transferred, the switching logic unit 17 closes the switches S2 and S3 alternately, so that the storage devices 8, 9 are, according to the first part of the curve d in FIG. 2c, charged alternately with the voltage potentials of the capacitor elements 2, 3. The switches S2, S3 are in this case closed briefly only until the storage devices 8, 9 have received the voltage (FIGS. 2c.1, 2c.2). In order to avoid spurious measurement, the voltage at the center tap c must be neutralized with the aid of the switch S1 after each voltage jump. This is done, according to FIG. 2c.3, after each close pulse of the switches S2 and S3, respectively.

The control process will be explained in more detail with the aid of the flow charts in FIGS. 3 and 4. In this case the control can be carried out using known gate circuits or by a microcomputer.

The switching logic unit 17 is controlled by voltage changes at the input terminals a, b of the capacitors 2, 3. According to FIG. 3, after starting at point 30, the voltage or voltage change is first measured at point 31 and at point 32 a test is carried out as to whether a positive edge is present. If not, then the measurement at point 31 is repeated for the next cycle.

If the edge was positive, i.e. there was an acceleration, then the switch S2 is closed (point 34) for a predetermined time (sampling time t2) after a waiting time t1 (point 33) has elapsed. After a delay time t3 (point 35), the switch S1 is closed for a neutralization time t4 at point 36.

Figure 3:
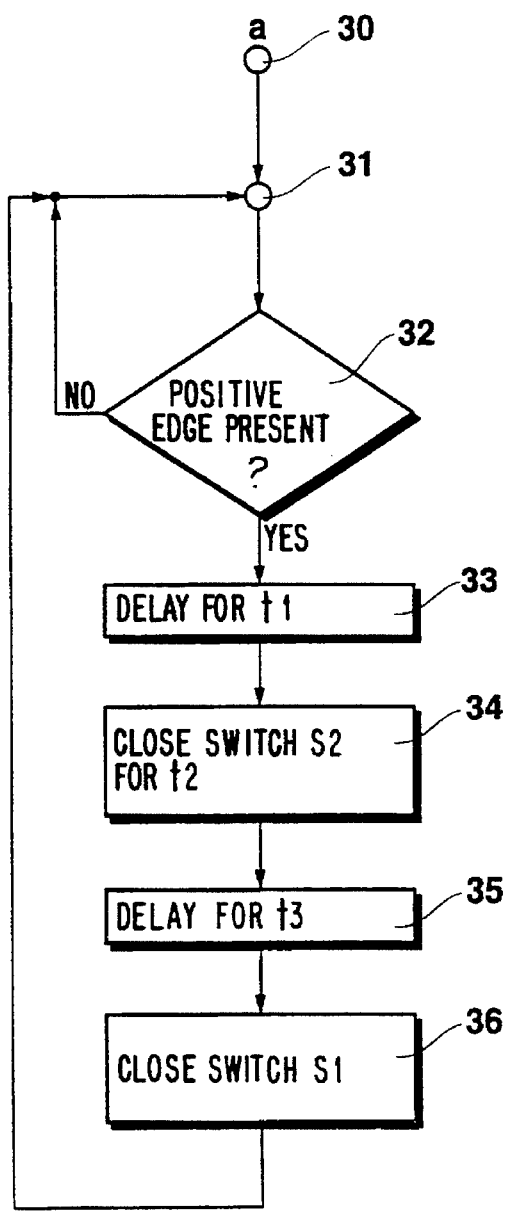
FIG. 3 shows a first flow chart and FIG. 4 shows a second flow chart.
Figure 4:
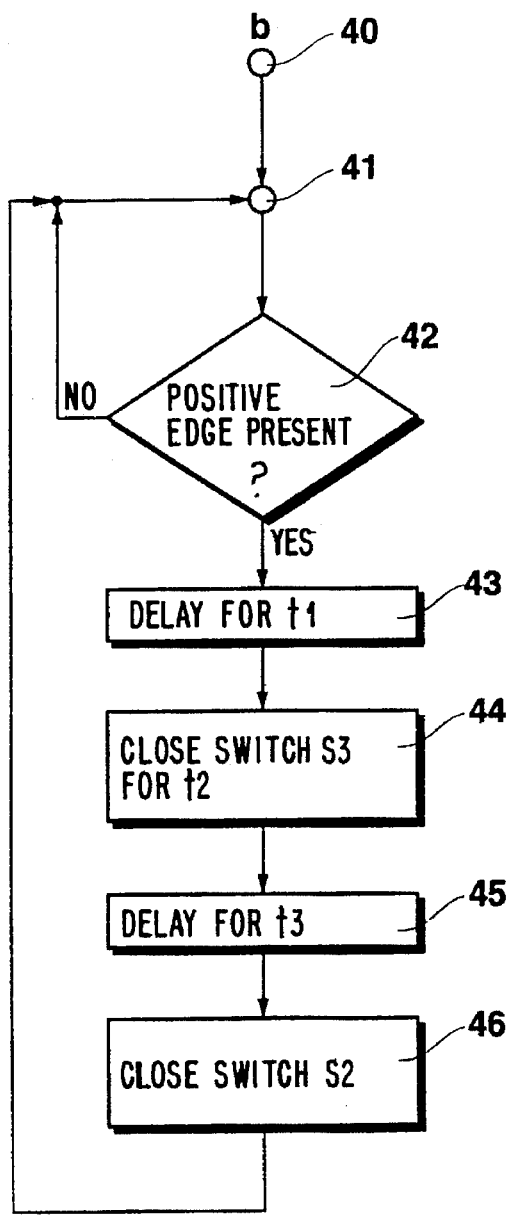

The timing of the process, according to FIG. 4, at the input terminal b (point 40) is synchronized with FIG. 3. After measurement and determination the edge (points 41, 42), the switch S3 (point 44) is closed for the sampling time t2 after the delay time t1 (point 43) has elapsed. After a delay time t3 at point 45, switch S1 closes for the neutralization time t4 (point 46). The cycle then recommences at points 31 and 41, respectively.

Figure 2E:
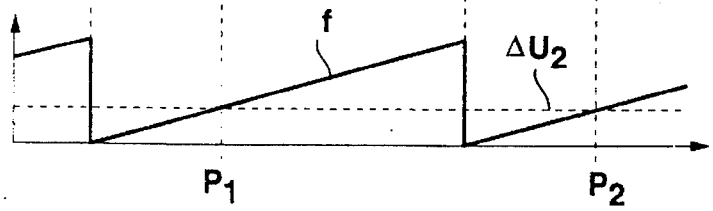

According to FIG. 2e, the modulator produces, using its operational amplifier 12 and the sawtooth generator 13, the PWM signal of FIG. 2a at the switching points P1 and P2 by comparison of the differential signal $\Delta U_2$ with a sawtooth voltage f. This signal is coupled back to the fixed electrodes of the two capacitors 2, 3 by means of the drivers 4, 5.

If the frequency of the sawtooth generator 13 is substantially above the resonant frequency of the sensor, then only the mean value of the pulse-width modulated signals acts on the inertial mass of the sensor 1 and produces an electrostatic force, opposed to the acceleration force, for positional control of the sensor 1. This results in simple positional control for the inertial mass or the oscillator of the sensor 1. High clock frequencies are possible by virtue of the simple linearity of the amplifier 6 with relatively low gain, so that even sensors with very small mass, which are, for example, produced using micromechanical techniques, can be utilized without the oscillator being excited in resonance by the clock frequency.

The maximum modulation depth and therefore the positional control range is fixed by the minimum pulse width of the PWM signal. The minimum pulse width is in this case fixed in such a way that it is possible, within the predetermined time, to transfer the charge between the capacitors, interrogate voltage changes and perform neutralization at the center tap c.

At the output of the operational amplifier 12, the signal is fed through a low-pass filter having a resistor 14 and a capacitor 15, and optionally also to an output amplifier 16, using which offset and sensitivity tuning can be carried out. The voltage $U_a$, which is proportional to the acceleration, is provided at the output of the amplifier 16, at the output terminal 18 of the evaluation circuit 20. A controller 11, which is preferably designed as a proportional controller (P controller) is connected between the differential amplifier 10 and the modulator. The controller 11 is produced in the form of an operational amplifier that can be wired up as desired and is used for setting the control characteristic of the evaluation circuit 20 and of the sensor 1. The controller 11 has an input 19 via which a test signal for testing the functional integrity of this system can be fed in. This gives the advantage that self-monitoring can be used for automatically testing the reliability of this circuit arrangement, so that, in particular in the case of application to activating an air bag in a motor vehicle, high reliability is achieved.

What is claimed is:

1. A circuit arrangement for evaluating a capacitive signal from an acceleration sensor, said acceleration sensor comprising two fixed electrodes with an electric field between said fixed electrodes; a first electrode on an oscillating mass in the electric field between the two fixed electrodes, said first electrode being deflectable in the electric field by an acceleration force, said two fixed electrodes and said first electrode being electrically connected to form two capacitors (2,3) with a common center tap (c) acting together as a differential capacitor, said two capacitors (2,3) having approximately equal capacitances in a resting state of the acceleration sensor; controllable drivers (4,5) for the two capacitors (2,3) formed by the two fixed electrodes and the first electrode, said controllable drivers (4,5) including means for charging the two capacitors (2,3) in phase opposition and means for transferring charge from one of the two capacitors to another periodically with square-wave signals in phase opposition and with a predetermined voltage amplitude; and an evaluation circuit (20) for generating an acceleration-dependent signal, said evaluation circuit (20) including means for measuring a voltage at the common center tap (c) of said two capacitors (2,3) and means for determining a voltage change ($\Delta U$) after a transfer of said charge between said two capacitors (2,3).

2. The circuit arrangement as defined in claim 1, wherein the predetermined voltage amplitude is an operating voltage.

3. The circuit arrangement as defined in claim 1, wherein the evaluation circuit (20) includes a first switch (S1) for applying a predetermined voltage ($U_b$) to the center tap (c) of the two capacitors (2, 3).

4. The circuit arrangement as defined in claim 1, wherein the evaluation circuit (20) includes an amplifier (6) having an amplifier input connected to the center tap (c).

5. The circuit arrangement as defined in claim 1, wherein the evaluation circuit (20) includes two controllable storage devices (8,9) connected electrically to the center tap (c) of the two capacitors (2,3), each one of said controllable storage devices (8, 9) respectively assigned to each one of said two capacitors (2,3).

6. The circuit arrangement as defined in claim 5, wherein the evaluation circuit (20) includes a first switch (S1) for connecting the center tap (c) of the two capacitors (2,3) to a predetermined voltage ($U_b$), said two controllable storage devices (8,9) are connected to the center tap (c) via respective storage device switches (S2,S3) and wherein the evaluation circuit (20) includes a switching logic unit (17) having means for controlling the first switch (S1) and the two storage device switches (S2,S3).

7. The circuit arrangement as defined in claim 1, wherein the evaluation circuit (20) includes a differential amplifier (10) having differential amplifier inputs connected electrically to the center tap (c) and means for producing an output potential.

8. The circuit arrangement as defined in claim 7, wherein the evaluation circuit (20) includes means for converting the output potential of the differential amplifier (10) into a pulse-width modulated signal, said means for converting including a sawtooth generator (13).

9. The circuit arrangement as defined in claim 8, further comprising means for controlling the drivers (4, 5) with said pulse-width modulated signal so that the oscillating mass of the acceleration sensor (1) assumes a predetermined position.

10. The circuit arrangement as defined in claim 8, wherein the evaluation circuit (20) has an evaluation circuit output (18) at which an output voltage ($U_a$) proportional to the acceleration appears.

11. The circuit arrangement as defined in claim 1, wherein the evaluation circuit (20) has an evaluation circuit input (19) for a test signal for testing functional reliability.

12. The circuit arrangement as defined in claim 1, wherein the evaluation circuit (20) is integrated on a chip.

13. The circuit arrangement as defined in claim 12, wherein the acceleration sensor is integrated on said chip with said evaluation circuit and said acceleration sensor is micromechanical.

14. The circuit arrangement as defined in claim 13, wherein the evaluation circuit (20) is an activation circuit for an air bag in a motor vehicle.

* * * * *